US011961461B2

(12) United States Patent
Kim et al.

(10) Patent No.: US 11,961,461 B2
(45) **Date of Patent: *Apr. 16, 2024**

(54) PIXEL CIRCUIT

(71) Applicant: SAMSUNG DISPLAY CO., LTD., Yongin-si (KR)

(72) Inventors: Hyun Joon Kim, Yongin-si (KR); Kyung Hoon Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,347

(22) Filed: Jan. 23, 2023

(65) Prior Publication Data

US 2023/0162666 A1 May 25, 2023

Related U.S. Application Data

(62) Division of application No. 16/924,050, filed on Jul. 8, 2020, now Pat. No. 11,562,682.

(30) Foreign Application Priority Data

Aug. 30, 2019 (KR) ........................ 10-2019-0107516

(51) Int. Cl.
*G09G 3/32* (2016.01)
*G09G 3/12* (2006.01)

(52) U.S. Cl.
CPC ....... *G09G 3/12* (2013.01); *G09G 2300/0809* (2013.01); *G09G 2320/0242* (2013.01)

(58) Field of Classification Search
CPC ............. G09G 3/32; G09G 2300/0809; G09G 2320/0242; G09G 3/3233;
(Continued)

(56) References Cited

U.S. PATENT DOCUMENTS 7,956,831 B2 6/2011 Roush et al.
10,297,205 B2 5/2019 Hwang et al.
(Continued)

FOREIGN PATENT DOCUMENTS

CN 102760404 A 10/2012
CN 107038999 A 8/2017
(Continued)

OTHER PUBLICATIONS

Gong, Zheng, et al., "Size-dependent light output, spectral shift, and self-heating of 400 nm InGaN light-emitting diodes," Journal of Applied Physics, vol. 107, 013103, 2010, 6 pages.
(Continued)

*Primary Examiner* — Amare Mengistu
*Assistant Examiner* — Gloryvid Figueroa-Gibson
(74) *Attorney, Agent, or Firm* — Lewis Roca Rothgerber Christie LLP

(57) ABSTRACT

A pixel circuit includes: a first transistor including a gate electrode connected to a first node, a source electrode connected to a first power line, and a drain electrode connected to a second power line; a light emitting element connected between the first transistor and the first or second power line; a second transistor connected between a data line and the first node, and including a gate electrode connected to a first scan line; a first capacitor connected between the first node and the source electrode of the first transistor; a third transistor connected between the first node and the first power line, and including a gate electrode connected to a second node; a fourth transistor connected between the second node and the data line, and including a gate electrode connected to a second scan line; and a second capacitor connected between the second node and a first control line.

20 Claims, 18 Drawing Sheets

(58) Field of Classification Search
CPC ... G09G 2300/0819; G09G 2300/0866; G09G 3/2081; G09G 3/2003; G09G 2300/0439; G09G 2300/0852; G09G 2310/06
USPC ........................................................... 345/82
See application file for complete search history.

(56) References Cited

U.S. PATENT DOCUMENTS

| | | | |
|---|---|---|---|
| 10,504,406 | B2 | 12/2019 | Shigeta et al. |
| 10,593,251 | B2 | 3/2020 | Shigeta et al. |
| 2009/0243976 | A1 | 10/2009 | Choi |
| 2011/0084993 | A1 | 4/2011 | Kawabe |
| 2018/0293929 | A1* | 10/2018 | Shigeta ................ G09G 3/3233 |
| 2018/0301080 | A1 | 10/2018 | Shigeta et al. |
| 2019/0326751 | A1 | 10/2019 | Xi |
| 2020/0302840 | A1 | 9/2020 | Kim et al. |

FOREIGN PATENT DOCUMENTS

| | | | |
|---|---|---|---|
| CN | 108694908 | A | 10/2018 |
| CN | 108735143 | A | 11/2018 |
| CN | 110085161 | A | 8/2019 |
| KR | 10-1503823 | B1 | 3/2015 |
| KR | 10-1549507 | B1 | 9/2015 |
| KR | 10-2018-0114816 | A | 10/2018 |
| KR | 10-2018-0115615 | A | 10/2018 |
| KR | 10-2020-0113089 | A | 10/2020 |

OTHER PUBLICATIONS

Lin, Chien-Chung, et al., "Ultra-Fine Pitch Thin-Film Micro LED Display for Indoor Applications," 59-2: Invited Paper, SID 2018 DIGEST, 2018, 4 pages.

Chinese Office Action dated Dec. 22, 2023, issued in corresponding Chinese Patent Application No. 202010875347.6 (10 pages).

* cited by examiner

PIXEL CIRCUIT

CROSS-REFERENCE TO RELATED APPLICATIONS

This application is a divisional of U.S. patent application Ser. No. 16/924,050, filed Jul. 8, 2020, which claims priority to and the benefit of Korean Patent Application No. 10-2019-0107516, filed Aug. 30, 2019, the entire content of both of which is incorporated herein by reference.

BACKGROUND

1. Field

Aspects of one or more embodiments of the present disclosure relate to a pixel circuit.

2. Description of Related Art

Typical light emitting diode (LED) display panels have mainly employed passive matrix (PM) driving schemes, but active matrix (AM) driving schemes may be desired to achieve low power consumption. Although AM driving circuits have recently been used in organic light emitting diode (OLED) display panels, it may be difficult for an LED display to directly employ an AM driving circuit such as that used in an OLED display, because a color shift phenomenon of the LED display depending on an amount of driving current may be worse than that of the OLED display.

For example, a pulse amplitude modulation driving scheme, in which the amplitude of driving current varies depending on gray scales (e.g., on gray scale levels or gray scale values), may be used in OLED displays to clearly express the gray scales. However, if a typical pulse amplitude modulation driving circuit (e.g., such as those used in OLED displays) is directly applied to an LED display, a color shift phenomenon (e.g., a color shift problem) may occur in which a color for each gray scale (e.g., each gray scale level) changes (e.g., excessively changes) or deviates from a desired color.

The above information disclosed in this Background section is for enhancement of understanding of the background of the invention, and therefore, it may contain information that does not constitute prior art.

SUMMARY

One or more embodiments of the present disclosure are directed to a pixel circuit that is capable of reducing or mitigating a color shift phenomenon.

According to an embodiment of the present disclosure, a pixel circuit includes: a first transistor including a gate electrode connected to a first node, a source electrode connected to a first power line, and a drain electrode connected to a second power line; a light emitting element connected between the first power line and the first transistor, or connected between the second power line and the first transistor; a second transistor connected between a data line and the first node, the second transistor including a gate electrode connected to a first scan line; a first capacitor connected between the first node and the source electrode of the first transistor; a third transistor connected between the first node and the first power line, the third transistor including a gate electrode connected to a second node; a fourth transistor connected between the second node and the data line, the fourth transistor including a gate electrode connected to a second scan line; and a second capacitor connected between the second node and a first control line.

In an embodiment, the first control line may be configured to supply a voltage that is gradually reduced or gradually increased during a first period.

In an embodiment, a voltage of the second power line may be less than a voltage of the first power line during the first period.

In an embodiment, the pixel circuit may further include a fifth transistor connected between the second node and the first power line, the fifth transistor including a gate electrode connected to a second control line.

In an embodiment, a turn-on period of the fourth transistor may not overlap with a turn-on period of the second transistor.

In an embodiment, after a second period having a duration that may be less than that of the first period has passed, the third transistor may be turned on, and the first transistor may be turned off.

In an embodiment, the first scan line and the second control line may be connected to the same node.

In an embodiment, a turn-on period of the fifth transistor may not overlap with a turn-on period of the second transistor.

In an embodiment, the pixel circuit may further include a sixth transistor connected between the second capacitor and the first control line, the sixth transistor including a gate electrode connected to a third control line.

In an embodiment, the sixth transistor may be configured to be turned on during the first period.

In an embodiment, the pixel circuit may further include: a third power line; and a seventh transistor connected between a third node and the third power line, the seventh transistor including a gate electrode connected to the second scan line.

In an embodiment, a voltage of the third power line may be equal to a voltage of an initial supply voltage supplied from the first control line during the first period.

In an embodiment, the pixel circuit may further include a third capacitor connected between the third node and a fourth power line.

In an embodiment, the first transistor may include an N-type transistor, and each of the second transistor through the seventh transistor may include a P-type transistor.

In an embodiment, the light emitting element may be connected between the source electrode of the first transistor and the second power line.

In an embodiment, the light emitting element may be connected between the drain electrode of the first transistor and the first power line.

According to an embodiment of the present disclosure, a pixel circuit includes: a first transistor including a gate electrode connected to a first node, a drain electrode connected to a first power line, and a source electrode connected to a second power line; a light emitting element connected between the second power line and the first transistor; a second transistor connected between a data line and the first node, the second transistor including a gate electrode connected to a first scan line; a first capacitor connected between the first node and the source electrode of the first transistor; a third transistor connected between the first node and the first power line, the third transistor including a gate electrode connected to a second node; a fourth transistor connected between the second node and the data line, the fourth transistor including a gate electrode connected to a second scan line; and a second capacitor connected between the second node and a first control line.

According to an embodiment of the present disclosure: a pixel circuit includes: a first transistor including a gate electrode connected to a first node, a drain electrode connected to a first power line, and a source electrode connected to a second power line; a light emitting element connected between the first power line and the first transistor; a second transistor connected between a data line and the first node, the second transistor including a gate electrode connected to a first scan line; a first capacitor connected between the first node and the source electrode of the first transistor; a third transistor connected between the first node and the first power line, the third transistor including a gate electrode connected to a second node; a fourth transistor connected between the second node and the data line, the fourth transistor including a gate electrode connected to a second scan line; and a second capacitor connected between the second node and a first control line.

DETAILED DESCRIPTION

Figure 1:
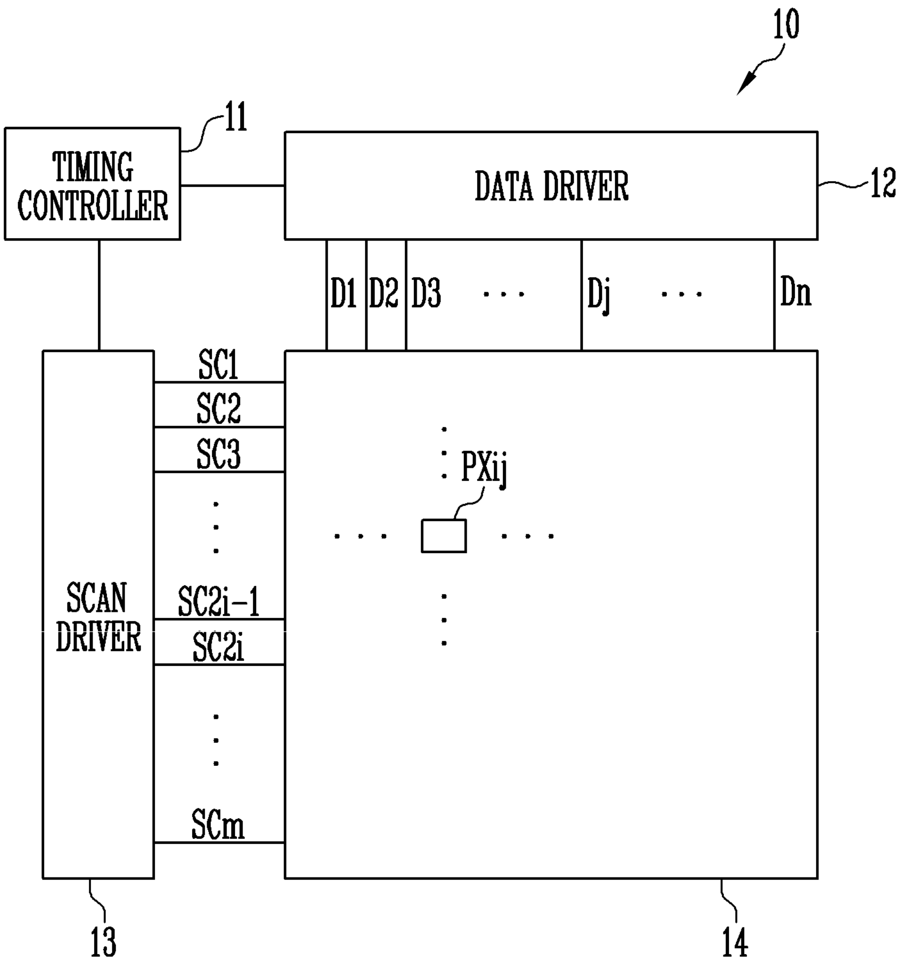
FIG. 1 is a diagram illustrating a display device in accordance with an embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

For example, in the following description, redundant descriptions and detailed descriptions of known functions and elements that may unnecessarily obscure the aspects and features of the present disclosure may be omitted. Further, repetitive description of the same or substantially the same elements or components may not be repeated.

In the drawings, the relative sizes of elements, layers, and regions may be exaggerated and/or simplified for clarity. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration. Further, a suffix such as "-er", "-or", and/or the like as used herein to describe a constituent element is intended for convenience of the description of the example embodiments, and the suffix itself may not be intended to give any special meaning or function.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device 10 in accordance with an embodiment of the present disclosure.

Referring to FIG. 1, the display device 10 in accordance with an embodiment of the present disclosure may include a timing controller 11, a data driver 12, a scan driver 13, and a pixel unit (e.g., a pixel area, a display area, or a display panel) 14.

The timing controller 11 may receive gray scale values and control signals for each image frame from an external processor (e.g., a host processor or a host device). The timing controller 11 may render the gray scale values in response to specifications of the display device 10. For example, the external processor may provide a red gray-scale value, a green gray-scale value, and a blue gray-scale value for each unit dot. However, for example, in the case where the pixel unit 14 (or a pixel circuit of a pixel PXij) has a pentile structure, because adjacent unit dots may share a pixel, the pixels may not correspond one-to-one with the respective gray scale values. In this case, it may be desired to render the gray scale values. On the other hand, if the pixels correspond one-to-one with the respective gray scale values, the operation of rendering the gray scale values may not be needed or desired (e.g., may not be required). Gray scale values that have been rendered or have not been rendered may be provided to the data driver 12. Furthermore, the timing controller 11 may provide, to the data driver 12, the scan driver 13, and the like, control signals that are suitable to express frames according to specifications of the respective components.

The data driver 12 may generate data voltages to be provided to data lines D1 to Dn (e.g., D1, D2, D3, . . . , Dj, . . . , and Dn) using the gray scale values and the control signals. For example, the data driver 12 may sample the gray scale values using a clock signal, and may apply data voltages corresponding to the gray scale values to the data lines D1 to Dn on a pixel row basis. Here, n is an integer greater than 0.

In more detail, in accordance with various embodiments, the data driver 12 may apply a pulse amplitude setting voltage, a pulse width setting voltage, and a linear change voltage to each pixel circuit of the pixels PXij to set a pulse amplitude and a pulse width of a driving current. The scan driver 13 may receive a clock signal, a scan start signal, and/or the like from the timing controller 11, and may generate scan signals to be provided to the scan lines SC1 to SCm (e.g., SC1, SC2, SC3, . . . , SC2*i*-1, SC2*i*, . . . , and SCm). Here, m is an integer greater than 0.

The scan driver 13 may supply (e.g., may sequentially supply) scan signals having a turn-on level pulse (e.g., having a turn-on voltage level) to the scan lines SC1 to SCm. The scan driver 13 may include scan stages including (e.g., configured in the form of) shift registers. The scan driver 13 may generate scan signals by transmitting (e.g., sequentially transmitting) a scan start signal having a suitable turn-on level pulse shape to a subsequent stage according to (e.g., under control of) a clock signal.

The pixel unit 14 includes a plurality of pixels PXij. Here, i and j may each be an integer greater than 0. Each pixel PXij may be coupled to a corresponding data line and a corresponding scan line. For example, the pixel PXij may refer to a pixel including a scan transistor that is coupled to an i-th scan line and a j-th data line. For example, a scan input terminal of the pixel PXij (e.g., a gate electrode of the scan transistor) may be coupled to the i-th scan line, and a data input terminal of the pixel PXij (e.g., one of a source electrode and a drain electrode of the scan transistor) may be coupled to the j-th data line.

The timing controller 11, the data driver 12, and the scan driver 13 may control the luminance of a light emitting element under control of the processor (e.g., the external processor), by using at least one of a pulse width modulation in which a duty ratio of the driving current is variously changed (e.g., or varies), and a pulse amplitude modulation in which the pulse amplitude of the driving current is variously changed (e.g., or varies). Furthermore, a pulse width modulation signal may control a duty ratio between a light-on state and a light-off state of one or more light sources. The duty ratio may be determined depending on a dimming value that is input from the processor (e.g., the external processor).

Figure 2:
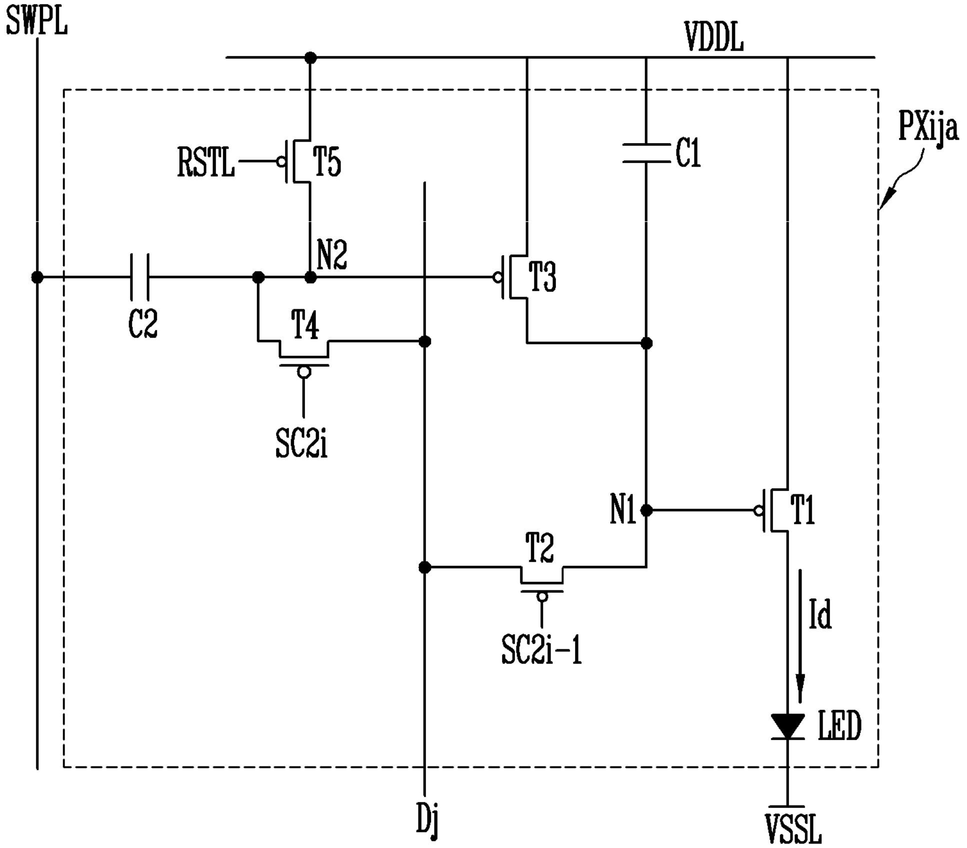
FIG. 2 is a diagram illustrating an example of a pixel of FIG. 1 in accordance with an embodiment of the present disclosure.
Figure 3A:
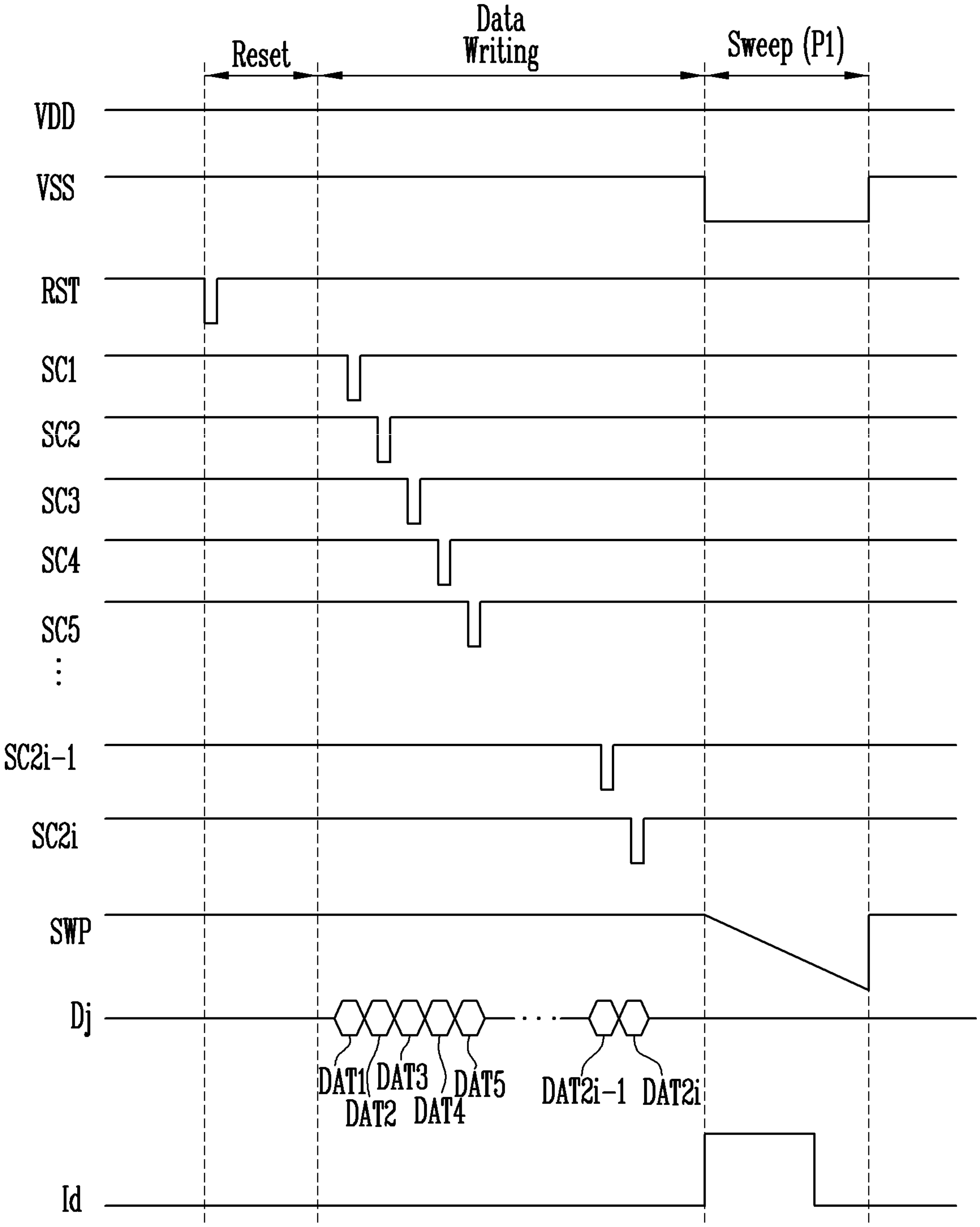
FIGS. 3A-4E are diagrams illustrating an example of a method of driving the pixel of FIG. 2.
Figure 3B:
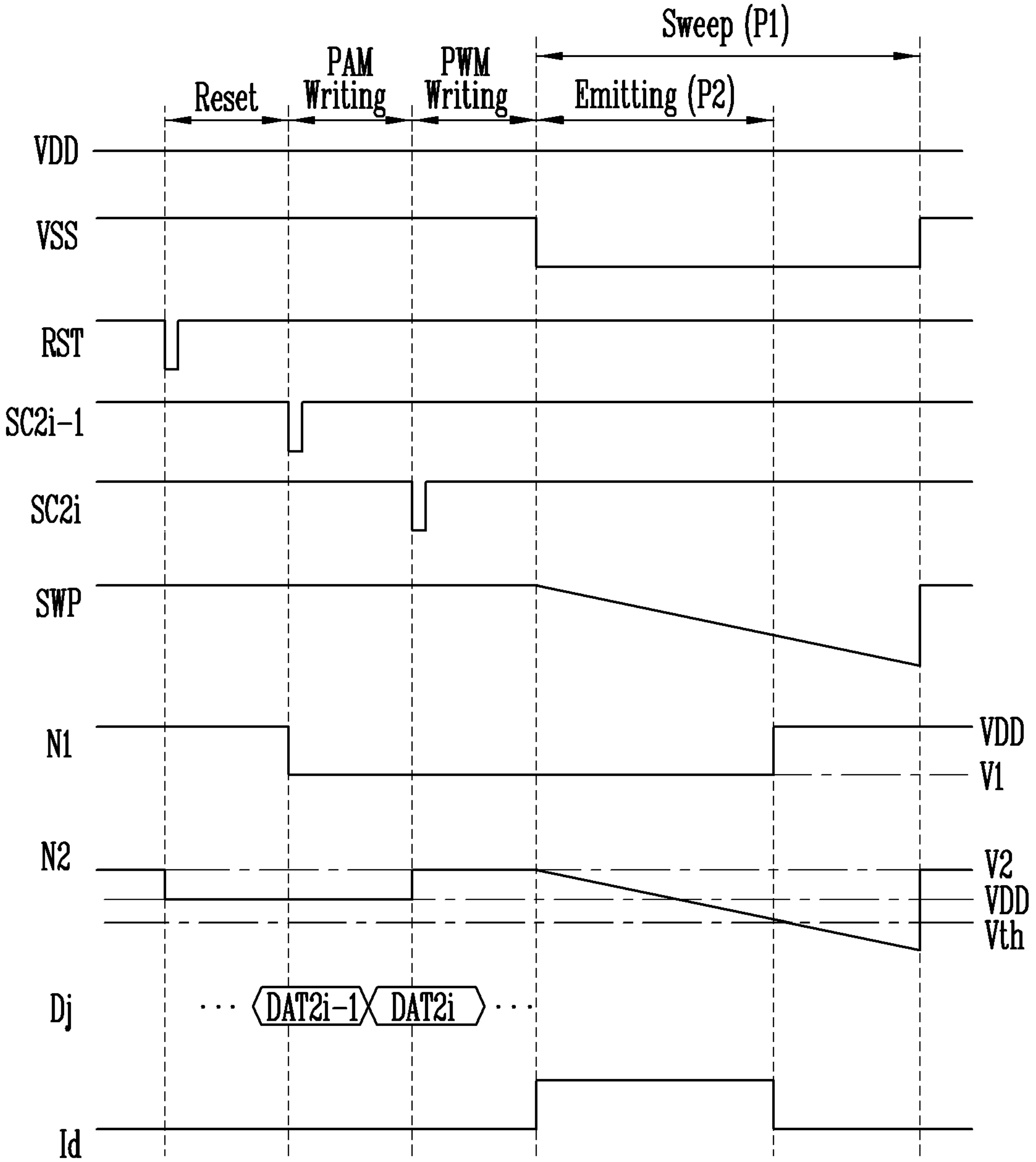

FIG. 2 is a diagram illustrating a first embodiment of a pixel illustrated in FIG. 1.

Referring to FIG. 2, the pixel PXija includes a plurality of transistors T1, T2, T3, T4, and T5, a plurality of capacitors C1 and C2, and a light emitting element LED.

Hereinafter, a circuit configured to include P-type transistors as a non-limiting example of the plurality of transistors T1, T2, T3, T4, and T5 will be described for convenience of description. However, those having ordinary skill in the art will understand that the present disclosure is not limited thereto, and the circuit may be configured to include an N-type transistor for any suitable one or more of the transistors T1, T2, T3, T4, and T5, by switching a polarity of a voltage to be applied to a gate terminal of each of the any suitable one or more of the transistors T1, T2, T3, T4, and T5. For example, those having ordinarily skill in the art will understand that the circuit may be configured to include an N-type transistor for each of the transistors T1, T2, T3, T4, and T5, or that the circuit may be configured to include a combination of one or more P-type transistors and one or more N-type transistors as the transistors T1, T2, T3, T4, and T5. As used herein, the term "P-type transistor" refers generally to a transistor in which the amount of flowing current increases when a voltage difference between a gate electrode and a source electrode of the transistor increases in a negative direction. As used herein, the term "N-type transistor" refers generally to a transistor in which the amount of flowing current increases when a voltage difference between a gate electrode and a source electrode of the transistor increases in a positive direction. Each of the transistors T1, T2, T3, T4, and T5 may be configured in various forms, for example, such as a thin film transistor (TFT), a field effect transistor (FET), a bipolar junction transistor (BJT), and/or the like.

The first transistor T1 may include a gate electrode coupled to a first node N1, a source electrode coupled to a first power line VDDL, and a drain electrode coupled to a second power line VSSL. The first transistor T1 may be referred to as a driving transistor.

The second transistor T2 may be coupled between the j-th data line Dj and the first node N1, and may include a gate electrode coupled to a first scan line SC2*i*-1. The second transistor T2 may be referred to as a pulse amplitude setting transistor.

The third transistor T3 may be coupled between the first node N1 and the first power line VDDL, and may include a gate electrode coupled to a second node N2. The third transistor T3 may be referred to as an emission control transistor.

The fourth transistor T4 may be coupled between the second node N2 and the j-th data line Dj, and may include a gate electrode coupled to a second scan line SC2*i*. The fourth transistor T4 may be referred to as a pulse width setting transistor.

The fifth transistor T5 may be coupled between the second node N2 and the first power line VDDL, and may include a gate electrode coupled to a second control line RSTL. The fifth transistor T5 may be referred to as an initialization transistor. In an embodiment, the second control line RSTL may be coupled to the same node as that of the first scan line SC2*i*-1. For example, the second control line RSTL may be coupled to the first scan line SC2*i*-1 via the same node.

The first capacitor C1 may be coupled between the first node N1 and the source electrode of the first transistor T1 (e.g., via the first power line VDDL).

The second capacitor C2 may be coupled between the second node N2 and a first control line SWPL. When a first control voltage SWP of the first control line SWPL that is coupled with the second capacitor C2 is reduced, the voltage of the second node N2 may also be reduced by the coupled second capacitor C2. When the voltage of the second node N2 is reduced to a value that is less than or equal to that of a threshold voltage of the third transistor T3, the third transistor T3 may be turned on.

The light emitting element LED may include an anode coupled to the drain electrode of the first transistor T1, and a cathode coupled to the second power line VSSL. The light emitting element LED may include (or may be formed of) an organic light emitting diode, an inorganic light emitting diode, or a quantum dot light emitting diode.

A first power supply voltage may be applied to the first power line VDDL. A second power supply voltage may be applied to the second power line VSSL. For example, the first power supply voltage may be greater than or less than the second power supply voltage. In an embodiment, for example, the first power supply voltage may be greater than the second power supply voltage during a first period.

FIGS. 3A to 3B and 4A to 4E are diagrams illustrating an example of a method of driving the pixel of FIG. 2. The first scan line SC2*i*−1 may be referred to as a 2i−1-th scan line SC2*i*−1. The second scan line SC2*i* may be referred to as a 2i-th scan line SC2*i*.

Figure 4A:
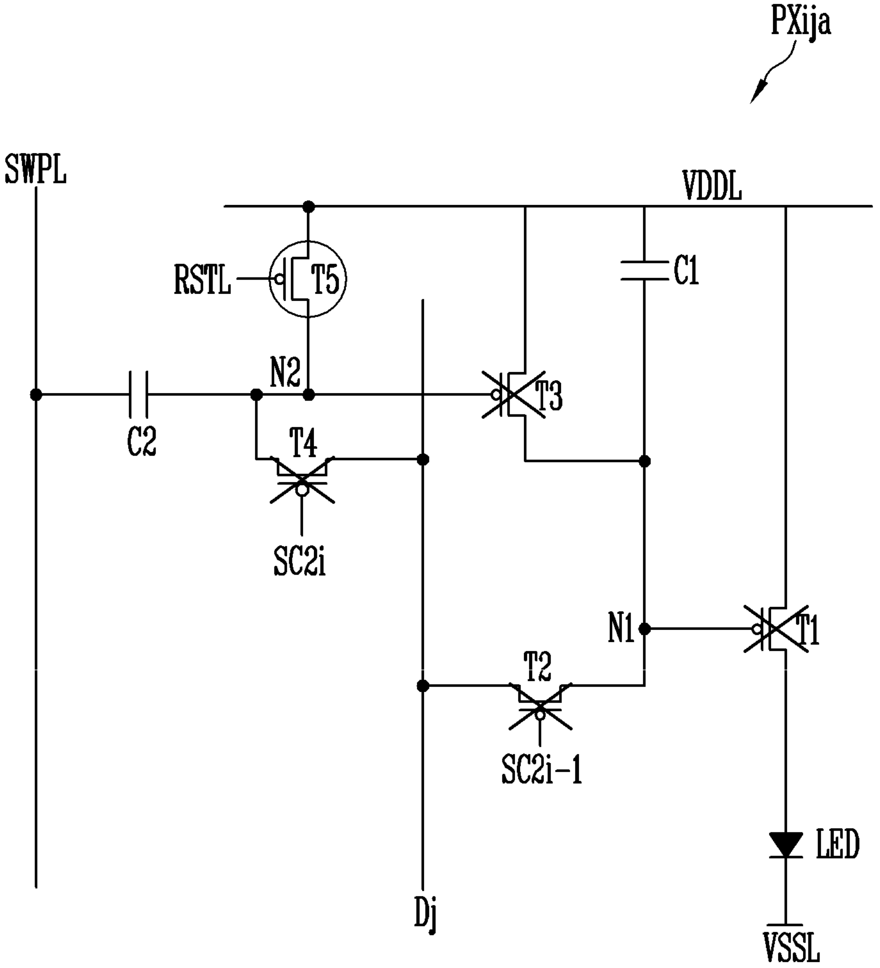
Figure 4B:
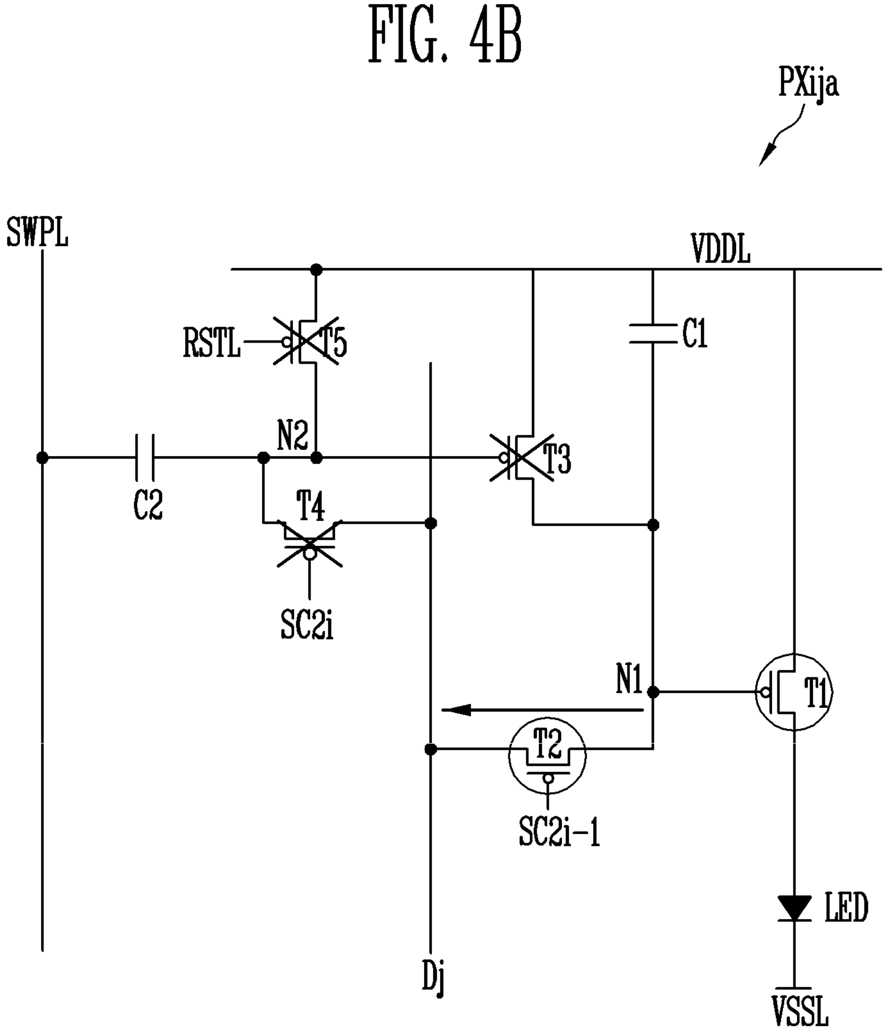
Figure 4C:
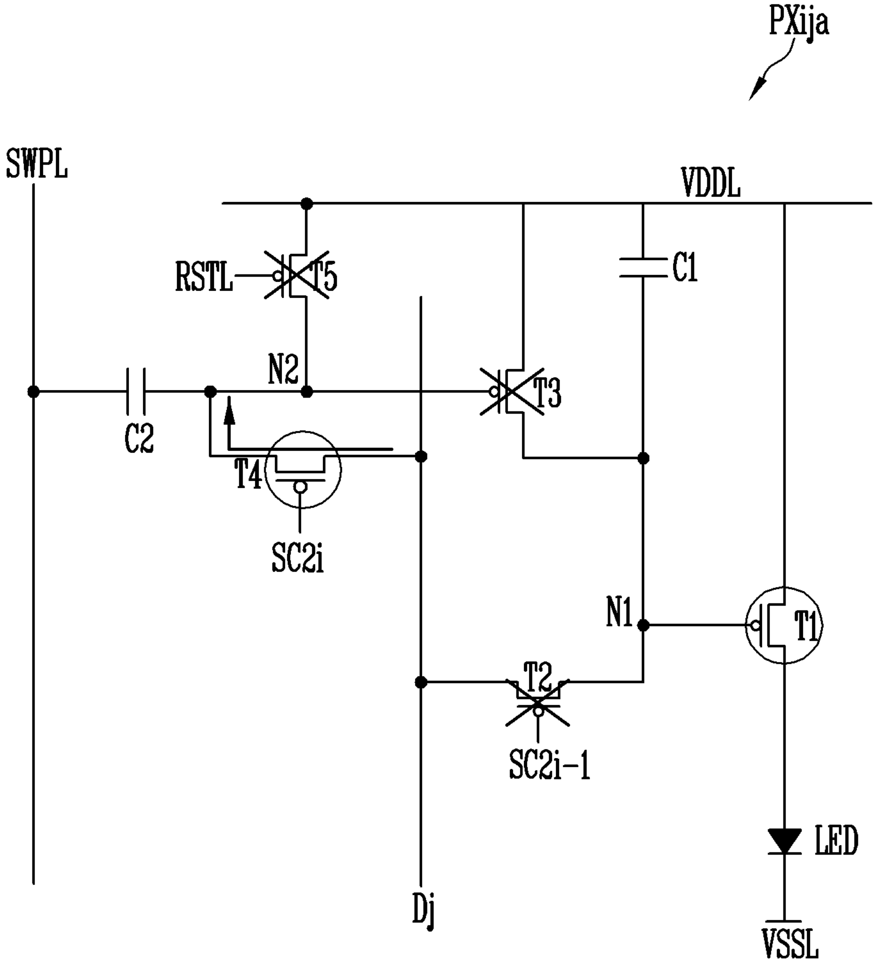

During a reset period (Reset), a second control signal RST having a turn-on level (e.g., a low level) may be applied to the second control line RSTL, and the fifth transistor T5 may be turned on (e.g., refer to FIG. 4A).

When the fifth transistor T5 is turned on, the first power line VDDL and the second node N2 may be electrically connected to each other. The first power supply voltage VDD may be applied to an end (e.g., an electrode connected to the second node N2) of the second capacitor C2. The second capacitor C2 may maintain or substantially maintain (e.g., or retain) a voltage corresponding to a difference between the first control voltage SWP and the first power supply voltage VDD.

During a data write period (Data Writing), a first data voltage DAT2*i*−1 for the i-th pixel PXija may be applied to the data line Dj, and a scan signal having a turn-on level may be applied to the 2i−1-th scan line SC2*i*−1. The second transistor T2 may be turned on (e.g., refer to FIG. 4B). The first data voltage DAT2*i*−1 may have a first voltage level V1.

Here, when the second transistor T2 is turned on, the data line Dj and the first node N1 may be electrically connected to each other, and the first data voltage DAT2*i*−1 may be applied to an end (e.g., an electrode connected to the first node N1) of the first capacitor C1. The first voltage level V1 may be less than a threshold voltage of the first transistor T1. In an embodiment, during a pulse amplitude setting period (PAM Writing), data voltages having the same voltage level (e.g., a first voltage level V1) as each other may be applied to the data lines (e.g., to all of the data lines). In an embodiment, during the pulse amplitude setting period (PAM Writing), data voltages having voltage levels that are independent from each other may be applied to the respective data lines.

During the pulse amplitude setting period (PAM Writing), the first power supply voltage VDD may be less than the second power supply voltage VSS. Here, although the first transistor T1 may be turned on depending on the voltage of the first node N1, the light emitting element LED may not emit light because the first power supply voltage VDD is less than the second power supply voltage VSS during the pulse amplitude setting period (PAM Writing).

During the pulse amplitude setting period (PAM Writing), a scan signal having a turn-off level (e.g., high level) is applied to the 2i-th scan line SC2*i*, and the fourth transistor T4 is in a turned-off state. Therefore, a turn-on period of the fourth transistor T4 may not overlap with that of the second transistor T2.

A second data voltage DAT2*i* for the i-th pixel PXija may be applied to the data line Dj. Then, during a pulse width modulation setting period (PWM Writing), a scan signal having a turn-on level may be applied to the 2i-th scan line SC2*i*. Thus, the fourth transistor T4 may be turned on, and the data line Dj and the second node N2 may be electrically connected to each other (e.g., refer to FIG. 4C). At this time, the second data voltage DAT2*i* may have a second voltage level V2.

When the fourth transistor T4 is turned on, the second data voltage DAT2*i* may be applied to an end (e.g., the electrode connected to the second node N2) of the capacitor C2. The second capacitor C2 may maintain or substantially maintain (e.g., retain) a voltage corresponding to a difference between the first control voltage SWP and the second data voltage DAT2*i*. The second voltage level V2 may be greater than the threshold voltage of the third transistor T3.

Figure 4D:
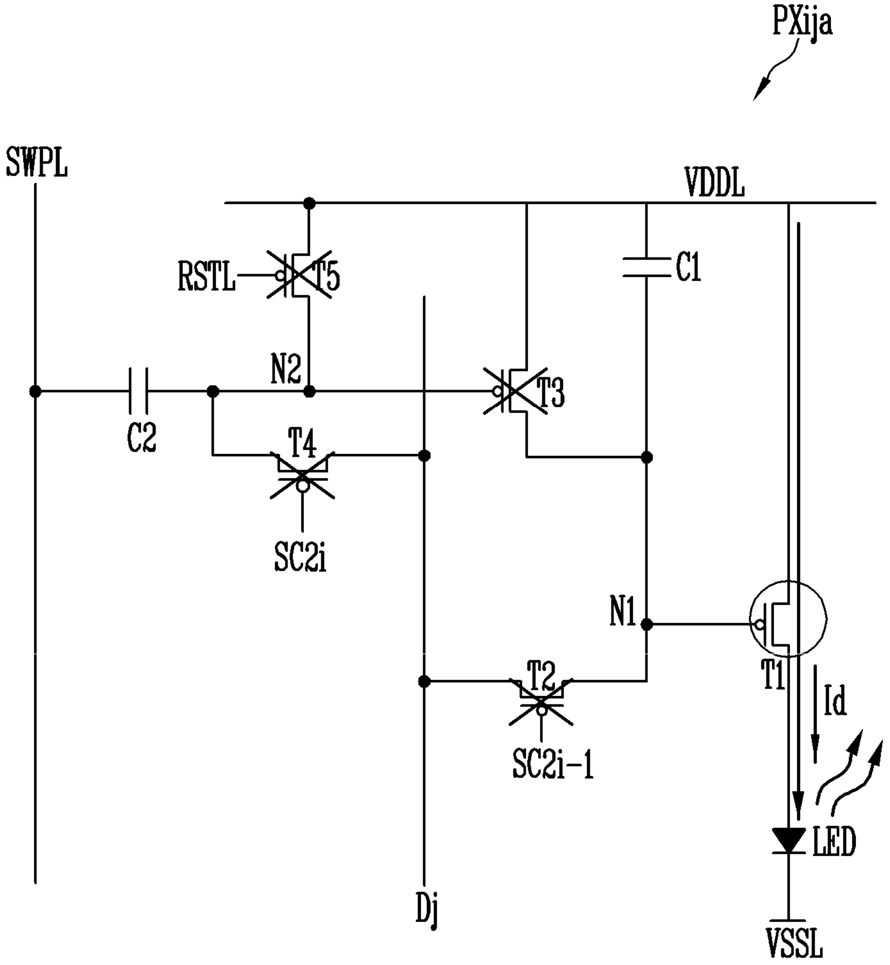

The first control line SWPL may supply the first control voltage SWP that is gradually reduced during a first period P1 (e.g., refer to FIG. 4D). On the other hand, in an embodiment, if the third transistor T3 is formed of an N-type transistor, the first control line SWPL may supply the first control voltage SWP that is gradually increased during the first period P1. As the first control voltage SWP is variously changed (e.g., varies), the voltage of the second node N2 may also be changed by the coupling of the second capacitor C2.

Here, during the first period P1, the first power supply voltage VDD may be greater than the second power supply voltage VSS by reducing the second power supply voltage VSS (or by increasing the first power supply voltage VDD). Thus, a driving current Id may flow through the first transistor T1, so that the light emitting element LED may emit light during a second period P2. The second period P2 may refer to a period defined by a point in time at which the first control voltage SWP starts to change (e.g., starts to vary) to a point in time at which the third transistor T3 is turned on.

Figure 4E:
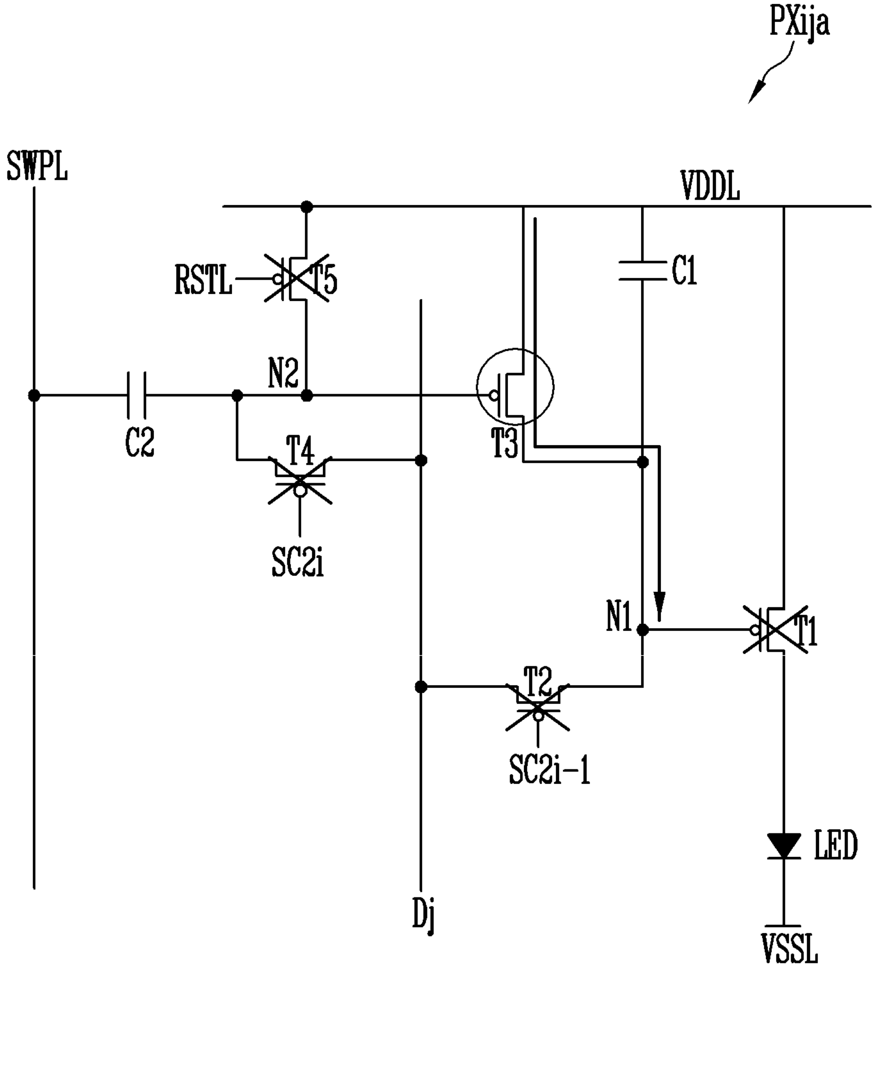

For example, when the voltage of the second node N2 is decreased or reduced to a desired level (e.g., or a desired value) that is less than that the threshold voltage of the third transistor T3 having the gate electrode that is coupled to the second node N2, the third transistor T3 may be turned on (e.g., refer to FIG. 4E).

When the third transistor T3 is turned on, the first power line VDDL and the first node N1 are electrically connected to each other, and the first node N1 is set to the first power supply voltage VDD. The first power supply voltage VDD may be greater than the threshold voltage of the first transistor T1, and the first transistor T1 may be turned off.

Here, the first control voltage SWP may be decreased (e.g., uniformly decreased) for the entire display area, and the point in time at which the third transistor T3 is turned off may be changed according to (e.g., depending on) the voltage of the second node N2 of the pixel PXija (e.g., according to the magnitude of the second data voltage DAT2*i*). When the third transistor T3 is turned off by a reduction in the voltage of the second node N2, the driving current Id no longer flows through the light emitting element LED, and thus, the light emitting element LED does not emit light. Therefore, the emission duty and the luminance of the pixel PXija may be controlled by adjusting the magnitude of the second data voltage DAT2*i*. In some embodiments, the luminance of the pixel PXija may be further controlled by adjusting the first data voltage DAT2*i*−1, in addition to the adjusting of the second voltage DAT2*i*. For example, pulse amplitude modification may be controlled according to (e.g., depending on) the first data voltage DAT2*i*−1, and pulse width modification may be controlled according to (e.g., depending on) the second data voltage DAT2*i*. Therefore, the pixel PXija may be driven by a combination of a pulse amplitude modification method and a pulse width modification method.

Hereinafter, various example embodiments of the present disclosure will be described. Aspects and features of one or more example embodiments of the pixel and method of driving the same that are described with reference to FIGS. 3A to 4E that do not conflict with the following description may be applicable or applied (e.g., may be directly applied) to one or more of the following embodiments described below. Therefore, the following description may be focused mainly on the differences from the one or more embodiments of the pixel circuit described above with reference to FIGS. 3A to 4E, and redundant description thereof may be simplified or may not be repeated.

Figure 5A:
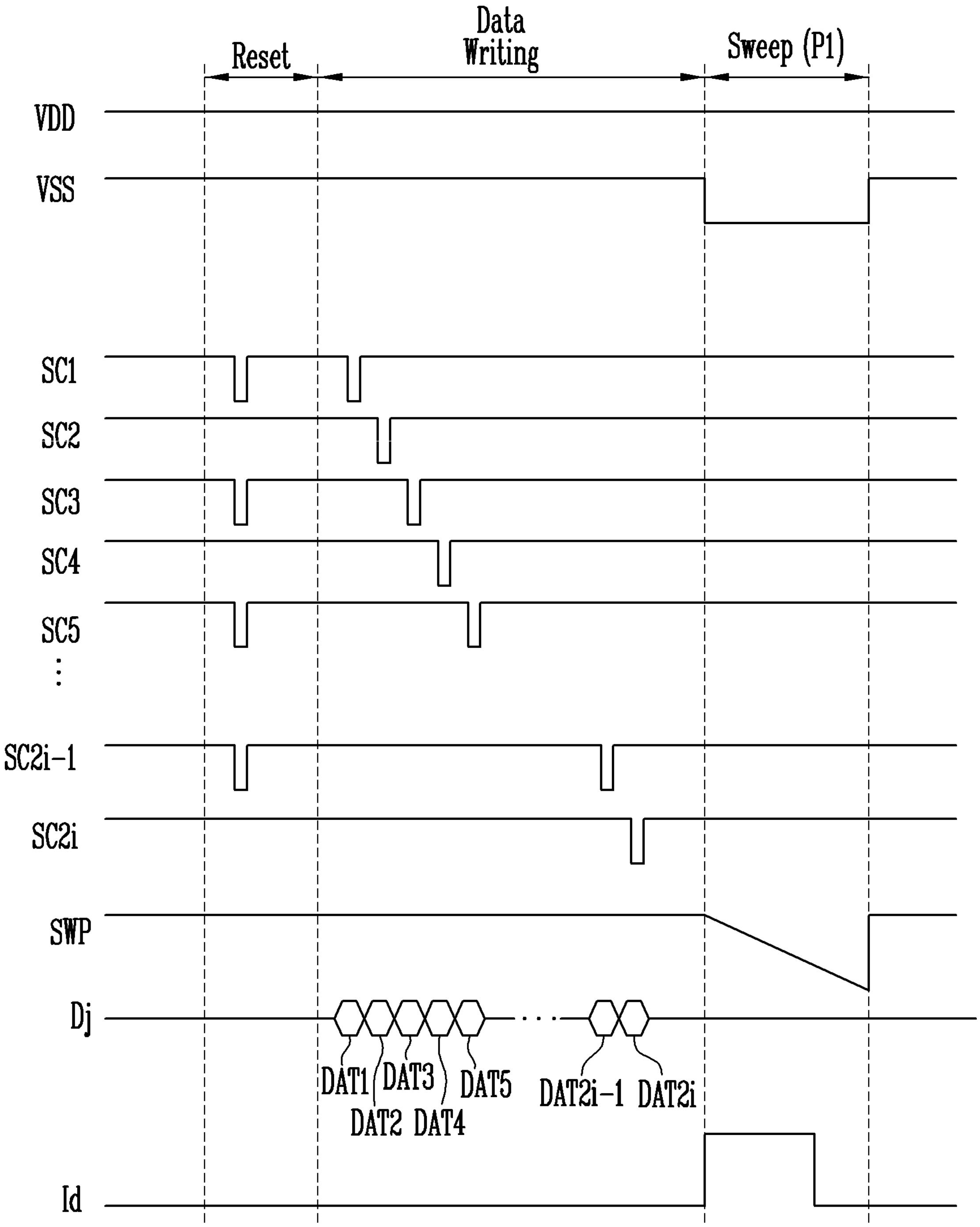
FIGS. 5A-5B are diagrams illustrating a method of driving the pixel of FIG. 2 in accordance with an embodiment of the present disclosure.
Figure 5B:
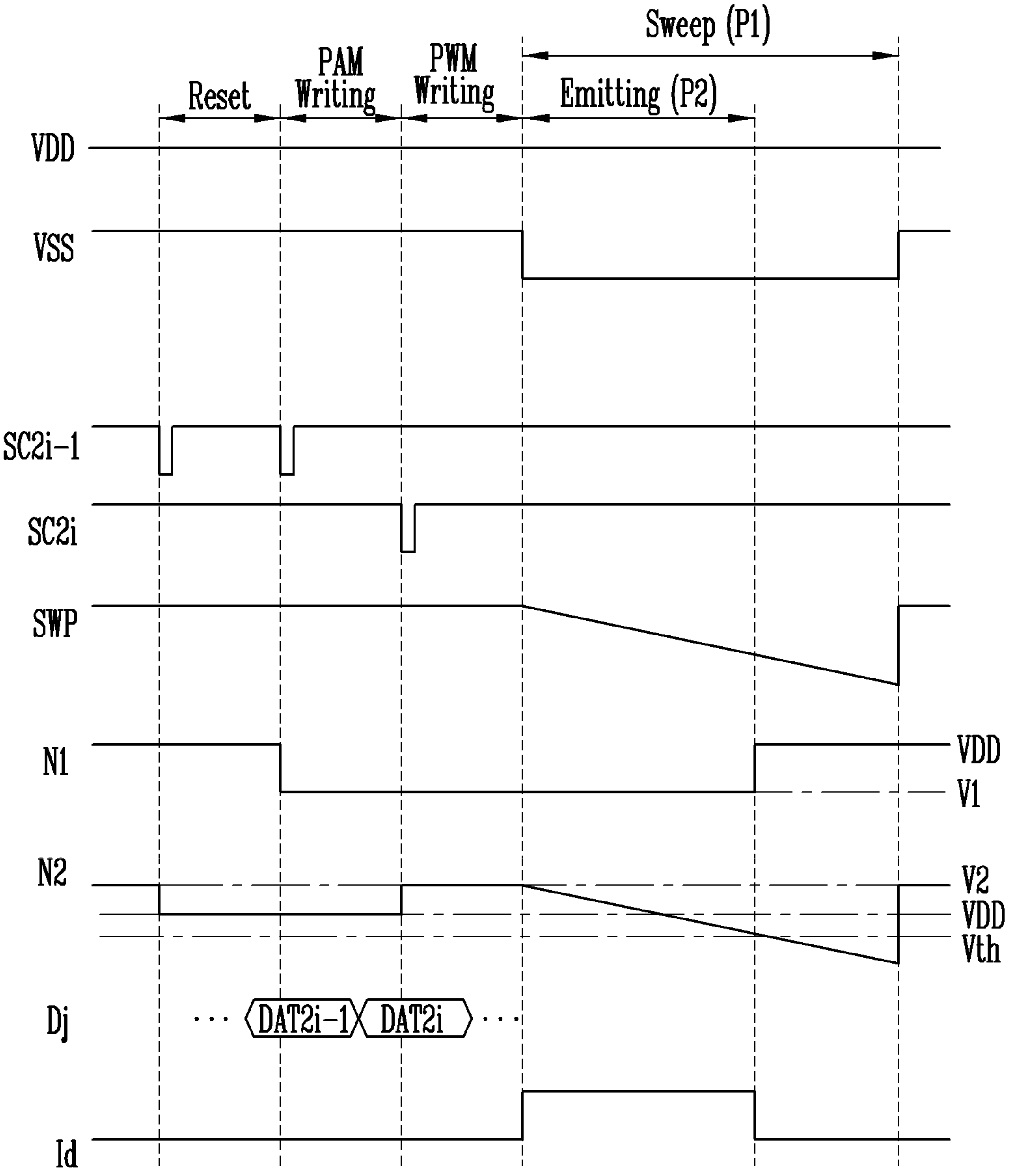

FIGS. 5A and 5B are diagrams for describing an example of a method of driving the pixel (e.g., the pixel of FIG. 2) in accordance with an embodiment. In more detail, FIGS. 5A and 5B are diagrams illustrating a case where the 2i−1-th scan line SC2*i*−1 and the second control line RSTL of the pixel in FIG. 2 are coupled to each other at the same node. Therefore, the following description with reference to FIGS. 5A and 5B may be mainly focused on the differences from one or more of the above embodiments.

Referring to FIGS. 5A and 5B, during a reset period (Reset), a scan signal having a turn-on level may be applied to the 2i−1-th scan line SC2*i*−1.

The first power line VDDL and the second node N2 may be electrically connected to each other. The first power supply voltage VDD may be applied to an end (e.g., the electrode connected to the second node N2) of the second capacitor C2. The second capacitor C2 may maintain or substantially maintain (e.g., or retain) a voltage corresponding to a difference between the first control voltage SWP and the first power supply voltage VDD.

During a data writing period (Data Writing), a scan signal having a turn-on level may be applied to the 2i−1-th scan line SC2*i*−1, and the second transistor T2 and the fifth transistor T5 may be turned on.

When the second transistor T2 is turned on, the data line Dj and the first node N1 may be electrically connected to each other, the first data voltage DAT2*i*−1 may be applied to an end (e.g., the electrode connected to the first node N1) of the first capacitor C1, and the first node N1 may be set to the first voltage level V1. The first voltage level V1 may be less than the threshold voltage of the first transistor T1. Here, although the first transistor T1 may be turned on depending on the voltage of the first node N1, the light emitting element LED may not emit light because the first power supply voltage VDD is less than the second power supply voltage VSS during the first period P1.

A scan signal having a turn-off level is applied to the 2i-th scan line SC2*i*, and the fourth transistor T4 is in a turned-off state. Therefore, a turn-on period of the fourth transistor T4 may not overlap with that of the second transistor T2.

Description of one or more operations during one or more following periods may be the same or substantially the same as that with reference to FIGS. 3A to 4E, and thus, redundant description thereof may not be repeated.

Figure 6:
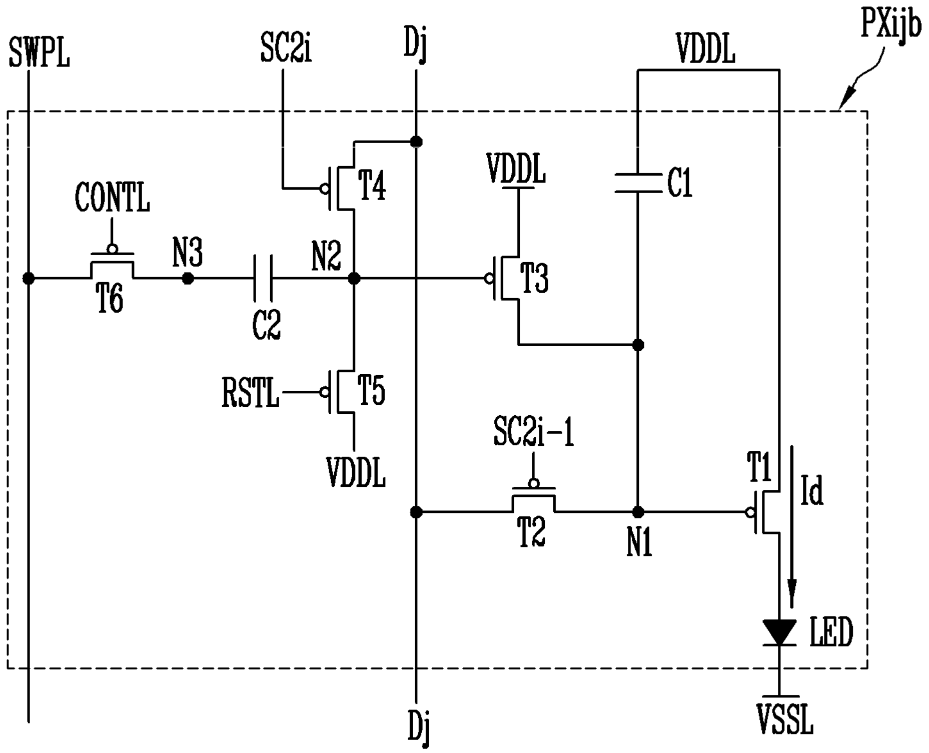
FIG. 6 is a diagram illustrating an example of a pixel of FIG. 1 in accordance with an embodiment of the present disclosure.

FIG. 6 is a diagram illustrating an example of pixel of FIG. 1 in accordance with an embodiment of the present disclosure. The pixel PXijb of FIG. 6 may be different from the pixel PXija of FIG. 2 in that the pixel PXijb of FIG. 6 further includes a sixth transistor T6 and a third control line CONTL. Therefore, the following description with reference to FIG. 6 may be mainly focused on the differences from one or more of the above embodiments.

Referring to FIG. 6, the second capacitor C2 may be coupled between the second node N2 and a third node N3. When the voltage of the third node N3 is reduced, the voltage of the second node N2 may also be reduced by the coupling of the second capacitor C2. When the voltage of the second node N2 is reduced to a value that is less than or equal to that of the threshold voltage of the third transistor T3, the third transistor T3 may be turned on.

The sixth transistor T6 may be coupled between the second capacitor C2 and the first control line SWPL, and may include a gate electrode coupled to the third control line CONTL. When a third control signal CONT having a turn-on level is applied to the third control line CONTL, the sixth transistor T6 may be turned on, and the voltage of the third node N3 may be controlled by changing (e.g., gradually changing or gradually varying) the first control voltage SWP.

Figure 7:
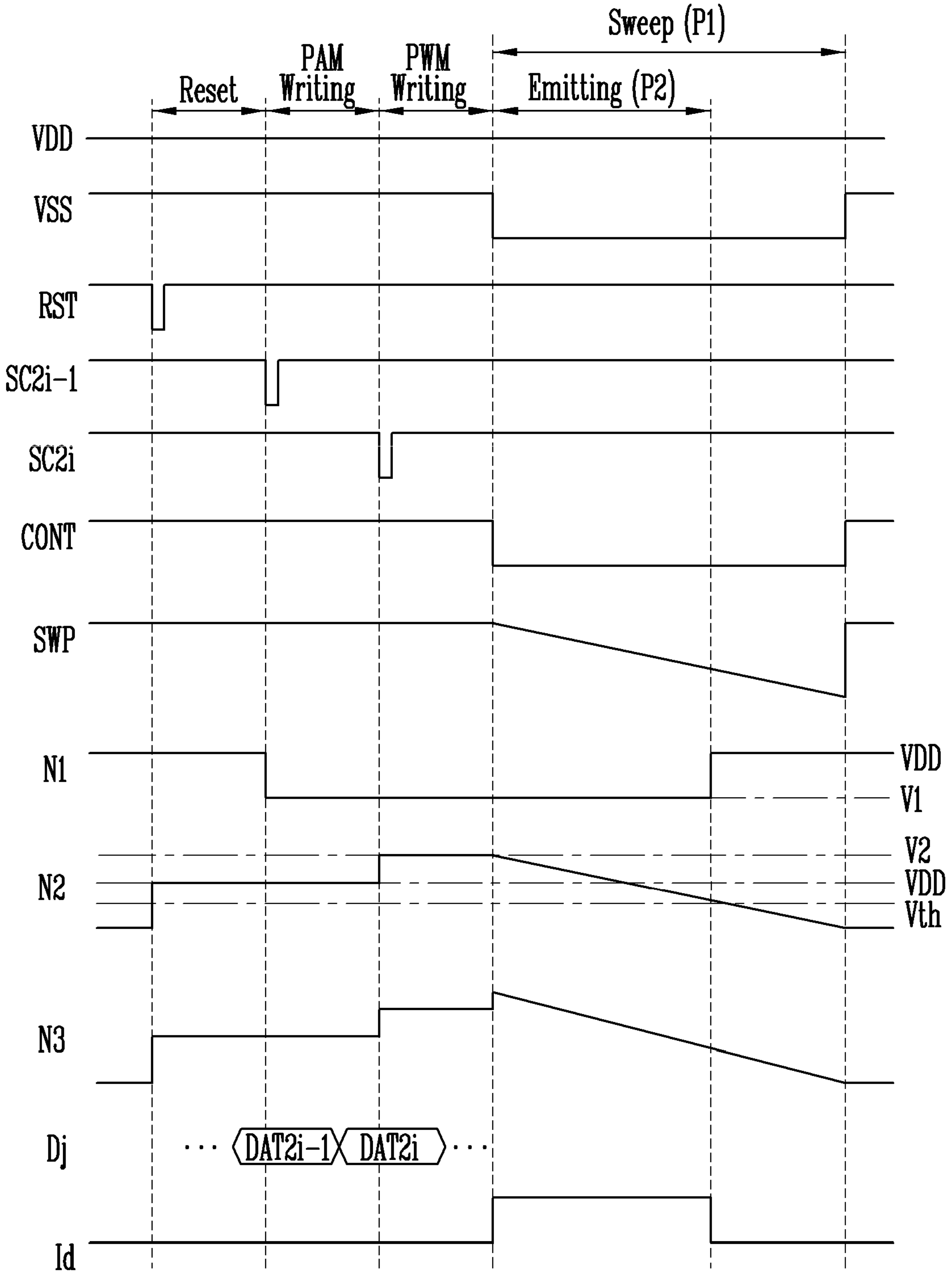
FIG. 7 is a diagram illustrating an example of a method of driving the pixel of FIG. 6.

FIG. 7 is a diagram illustrating an example of a method of driving the pixel of FIG. 6. Hereinafter, the following description with reference to FIG. 7 may be mainly focused on the differences from one or more of the above embodiments.

Referring to FIGS. 6 and 7, during a reset period (Reset), a second control signal RST having a turn-on level may be applied to the second control line RSTL, and the fifth transistor T5 may be turned on.

When the fifth transistor T5 is turned on, the first power line VDDL and the second node N2 may be electrically connected to each other. The first power supply voltage VDD may be applied to an end (e.g., the electrode connected to the second node N2) of the second capacitor C2. The second capacitor C2 may maintain or substantially maintain (e.g., retain) a voltage corresponding to a difference between the voltage of the third node N3 and the voltage of the second node N2. Thus, the second node N2 may be set to the first power supply voltage VDD. The voltage of the third node N3 may change (e.g., may vary) in response to a change (e.g., a variation) in voltage of the second node N2 by the coupling of the second capacitor C2.

When a first data voltage DAT2*i*−1 is applied to the data line Dj, and a signal having a turn-on level is applied to the 2i−1-th scan line SC2*i*−1 (e.g., during the PAM Writing period), the second transistor T2 may be turned on.

Here, a signal having a turn-off level is applied to the 2i-th scan line SC2*i*, and thus, a turn-on period of the second transistor T2 and a turn-on period of the fourth transistor T4 may not overlap with each other. When the second transistor T2 is turned on, the first node N1 and the data line Dj may be electrically connected to each other, the first data voltage DAT2*i*−1 may be applied to an end (e.g., the electrode connected to the first node N1) of the first capacitor C1, and the first node N1 may be set to the first voltage level V1.

When a second data voltage DAT2*i* is applied to the data line Dj, and a signal having a turn-on level is applied to the 2i-th scan line SC2*i* (e.g., during the PWM Writing period), the fourth transistor T4 may be turned on.

When the fourth transistor T4 is turned on, the second node N2 and the data line Dj may be electrically connected to each other. The second data voltage DAT2*i* may be applied to an end (e.g., the electrode connected to the second node N2) of the second capacitor C2. The second node N2 may be set to the second voltage level V2. The voltage of the third node N3 may change (e.g., may vary) in response to a change (e.g., a variation) in voltage of the second node N2 by the coupling of the second capacitor C2. Here, although the voltage of the third node N3 may be the same or substantially the same as that of the first control voltage SWP, the present disclosure is not limited thereto, and the voltage of the third node N3 may be different from that of the first control voltage SWP.

During the first period P1, a third control signal CONT having a turn-on level may be applied to the third control line CONTL, and the sixth transistor T6 may be turned on.

When the sixth transistor T6 is turned on, the first control line SWPL and the third node N3 may be electrically connected to each other. The first control voltage SWP may be applied to the other end (e.g., the other electrode connected to the third node N3) of the second capacitor C2. The second capacitor C2 may maintain or substantially maintain (e.g., retain) a voltage corresponding to a difference in voltage between the third node N3 and the second node N2. The third node N3 may be set to the first control voltage SWP.

Here, the first control line SWPL may supply a voltage that is reduced (e.g., gradually reduced) or increased (e.g., gradually increased) during the first period P1. As the first control voltage SWP changes (e.g., varies), the voltage of the second node N2 may also change (e.g., also varies) by the coupling of the second capacitor C2.

Description of one or more operations during one or more following periods may be the same or substantially the same as that with reference to FIGS. 3A to 4E, and thus, redundant description thereof may not be repeated.

Figure 8:
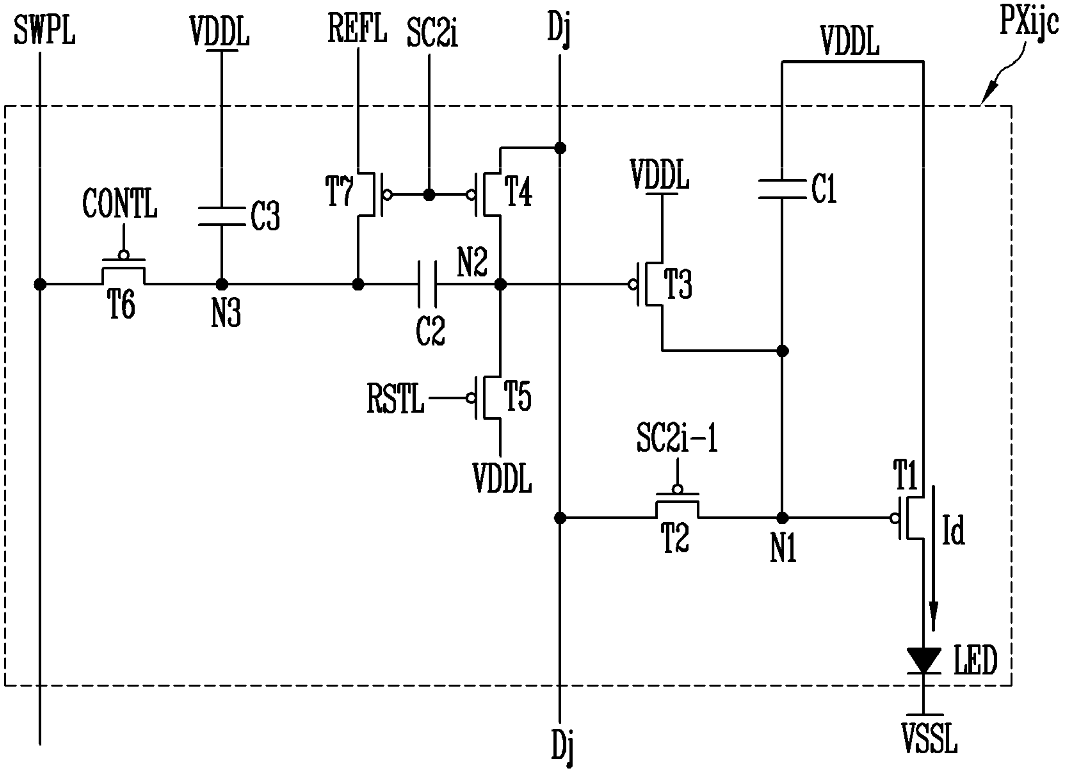
FIG. 8 is a diagram illustrating an example of a pixel of FIG. 1 in accordance with an embodiment of the present disclosure.

FIG. 8 is a diagram illustrating an example of a pixel of FIG. 1 in accordance with an embodiment of the present disclosure. The pixel PXijc of FIG. 8 may be different from the pixel PXijb of FIG. 6 in that the pixel PXijc of FIG. 8 further includes a seventh transistor T7, a third capacitor C3, and a third power line REFL. Therefore, the following description with reference to FIG. 8 may be mainly focused on the differences from one or more of the above embodiments.

The third capacitor C3 may be coupled between the third node N3 and the first power line VDDL.

The seventh transistor T7 may be coupled between the third power line REFL and the third node N3, and may include a gate electrode coupled to the second scan line SC2*i*. The gate electrode of the seventh transistor T7 may be coupled to the same node as that of the gate electrode of the fourth transistor T4. In other words, the gate electrode of the seventh transistor T7 may be connected to the gate electrode of the fourth transistor T4 via the same node. When a signal having a turn-on level (e.g., a turn-on voltage) is applied to the second scan line SC2*i*, the seventh transistor T7 may be turned on.

The third power line REFL may supply a voltage having the same or substantially the same voltage level as that of an initial supply voltage provided through the first control line SWPL during the first period P1.

Figure 9:
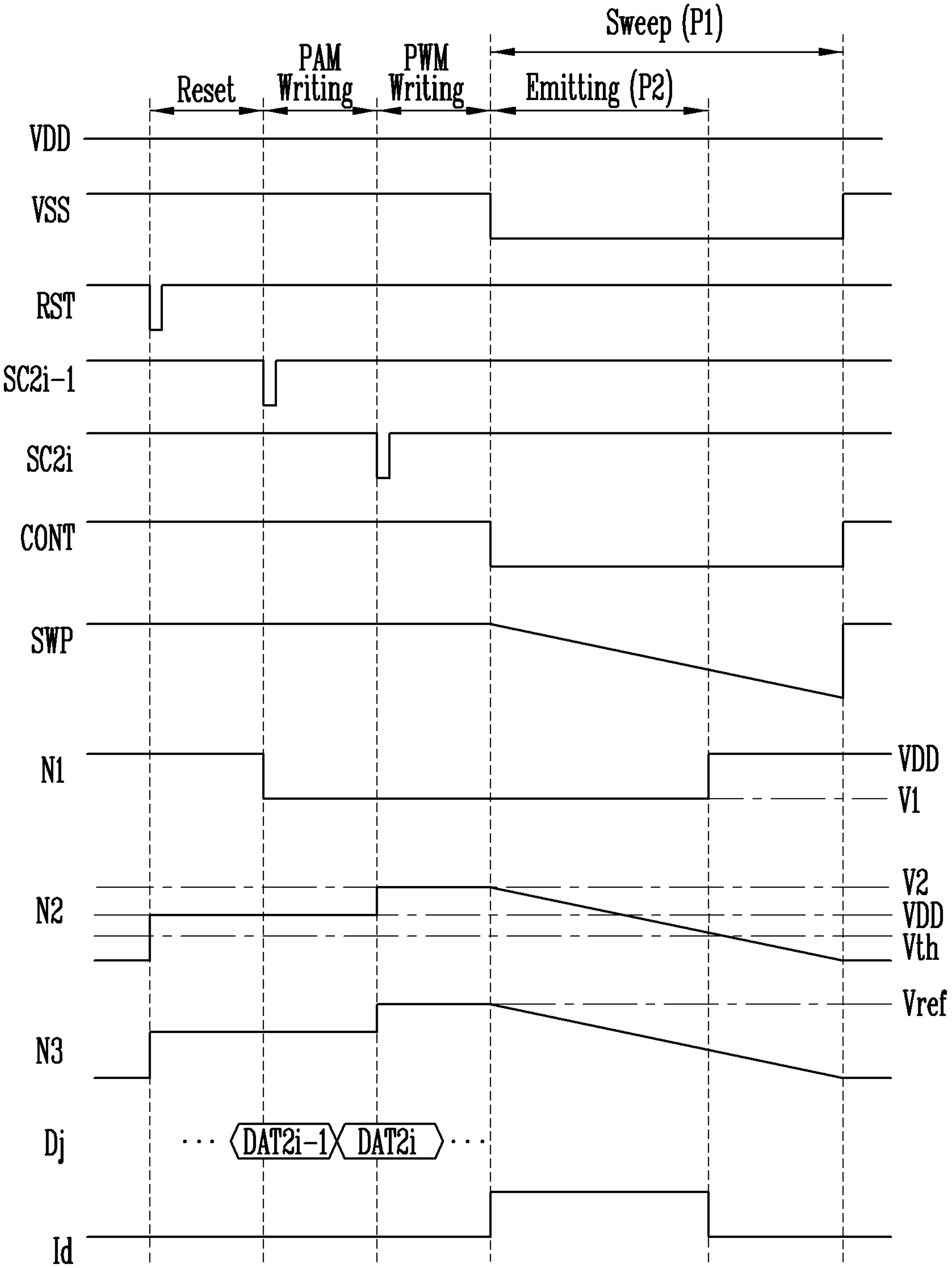
FIG. 9 is a diagram illustrating an example of a method of driving the pixel of FIG. 8.

FIG. 9 is a diagram illustrating an example of a method of driving the pixel of FIG. 8. Hereinafter, the following description with reference to FIG. 9 may be mainly focused on the differences from one or more of the above embodiments.

Referring to FIGS. 8 and 9, when a second data voltage DAT2*i* is applied to the data line Dj, and a signal having a turn-on level is applied to the 2i-th scan line SC2*i* (e.g., during the PWM Writing period), the fourth transistor T4 and the seventh transistor T7 may be turned on.

When the fourth transistor T4 is turned on, the second node N2 and the data line Dj may be electrically connected to each other. The second data voltage DAT2*i* may be applied to an end (e.g., the electrode connected to the second node N2) of the second capacitor C2. The second node N2 may be set to the second voltage level V2.

When the seventh transistor T7 is turned on, the third power line REFL and the third node N3 may be electrically connected to each other. A third power supply voltage Vref may be applied to the other end (e.g., the electrode connected to the third node N3) of the second capacitor C2. The third node N3 may be applied with the third power supply voltage Vref.

Here, the second capacitor C2 may maintain or substantially maintain (e.g., retain) a voltage corresponding to a difference between the voltage of the second node N2 and the voltage of the third node N3. The third power supply voltage Vref may be the same or substantially the same voltage as the initial supply voltage provided through the first control line SWPL during the first period P1. For example, the third power supply voltage Vref may have the same or substantially the same voltage level as that of the initial supply voltage of the first control line SWPL during the first period P1.

Description of one or more operations during one or more subsequent periods may be the same or substantially the same as that with reference to FIGS. 3A to 4E, and thus, redundant description thereof may not be repeated.

Figure 10:
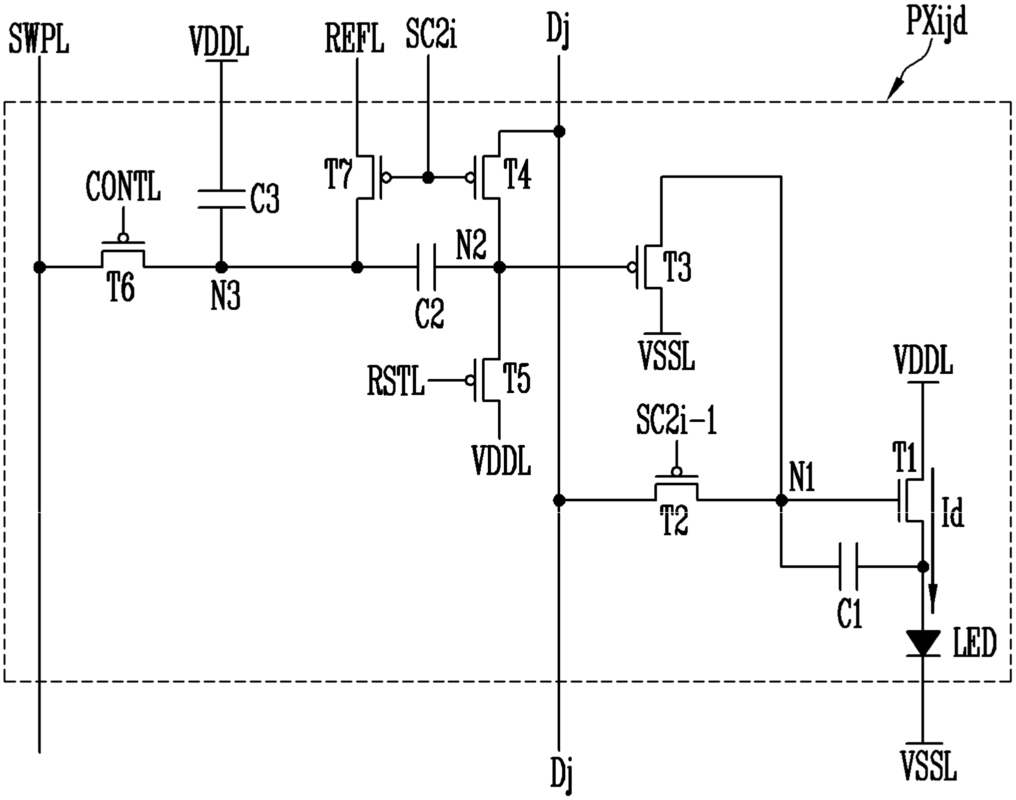
FIG. 10 is a diagram illustrating an example of a pixel of FIG. 1 in accordance with an embodiment of the present disclosure.

FIG. 10 is a diagram illustrating an example of a pixel of FIG. 1 in accordance with an embodiment of the present disclosure. Hereinafter, the following description with reference to FIG. 10 may be mainly focused on the differences from one or more of the above embodiments.

In the pixel PXijd of FIG. 10, the first transistor T1 may include (e.g., may be formed of) an N-type transistor, and each of the second to seventh transistors T2 to T7 may include (e.g., may be formed of) a P-type transistor.

The first transistor T1 may include a gate electrode coupled to the first node N1, a drain electrode coupled to the first power line VDDL, and a source electrode coupled to the second power line VSSL. For example, the source electrode of the first transistor T1 may be connected to the second power line VSSL via the light emitting element LED.

The third transistor T3 may include a gate electrode coupled to the second node N2, a first electrode coupled to the second power line VSSL, and a second electrode coupled to the first node N1.

The first capacitor C1 may be connected between the first node N1 and the first transistor T1. For example, the first capacitor C1 may have an electrode connected to the first node N1, and another electrode connected between the source electrode of the first transistor T1 and an anode of the light emitting element LED.

The light emitting element LED may be disposed between the source electrode of the first transistor T1 and the second power line VSSL.

Figure 11:
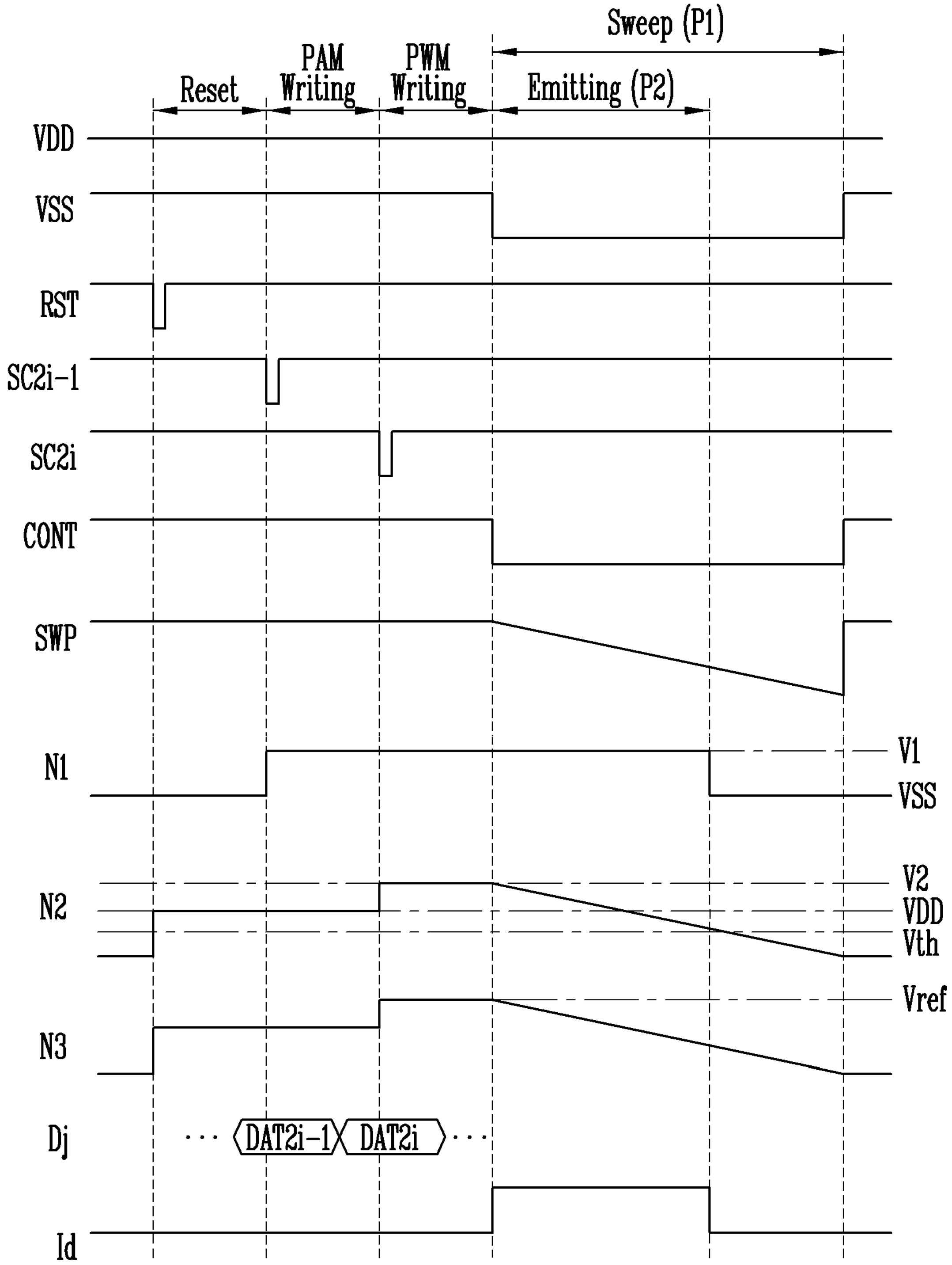
FIG. 11 is a diagram illustrating a method of driving the pixel of FIG. 10.

FIG. 11 is a diagram illustrating an example of a method of driving the pixel of FIG. 10. Hereinafter, the following description with reference to FIG. 11 may be mainly focused on the differences from one or more of the above embodiments.

Referring to FIGS. 10 and 11, when a first data voltage DAT2*i*−1 is applied to the data line Dj, and a signal having a turn-on level is applied to the 2i−1-th scan line SC2*i*−1 (e.g., during the PAM Writing period), the second transistor T2 may be turned on.

When the second transistor T2 is turned on, the data line Dj and the first node N1 may be electrically connected to each other, and the first data voltage DAT2*i*−1 may be applied to an end (e.g., the electrode connected to the first node N1) of the first capacitor C1. The first capacitor C1 may maintain or substantially maintain (e.g., may retain) a voltage corresponding to a difference between the voltage of the first node N1 and the voltage of the source electrode of the first transistor T1.

When a second data voltage DAT2*i* is applied to the data line Dj, and a signal having a turn-on level is applied to the 2i-th scan line SC2*i* (e.g., during the PWM Writing period), the fourth transistor T4 may be turned on.

When the fourth transistor T4 is turned on, the data line Dj and the second node N2 may be electrically connected to each other, and the second data voltage DAT2*i* may be applied to an end (e.g., the electrode connected to the second node N2) of the second capacitor C2. The second capacitor C2 may maintain or substantially maintain (e.g., may retain) a voltage corresponding to a difference between the voltage of the second node N2 and the voltage of the third node N3.

During the first period P1, a third control signal CONT having a turn-on level may be applied to the third control line CONTL, and the sixth transistor T6 may be turned on.

The light emitting element LED may emit light during the second period P2. The first control line SWPL may supply a voltage that is decreased (e.g., gradually decreased) or increased (e.g., gradually increased). For example, as the first control voltage SWP is gradually decreased, the voltage of the second node N2 may also be decreased by the coupling of the second capacitor C2.

Here, when the voltage of the second node N2 is decreased to a value (e.g., or a voltage level) that less than the threshold voltage of the third transistor T3, the third transistor T3 may be turned on, and the second power line VSSL and the first node N1 may be electrically connected to each other.

Here, the second power line VSSL may apply the second power supply voltage VSS to an end (e.g., an electrode) of the first capacitor C1, and the first node N1 may be set to the second power supply voltage VSS. The second power supply voltage VSS may be less than the threshold voltage of the first transistor T1.

Therefore, when the second power supply voltage VSS is applied to the first node N1, the first transistor T1 may be turned off so that the driving current Id does not flow, and as a result, the light emitting element LED may not emit light.

Figure 12:
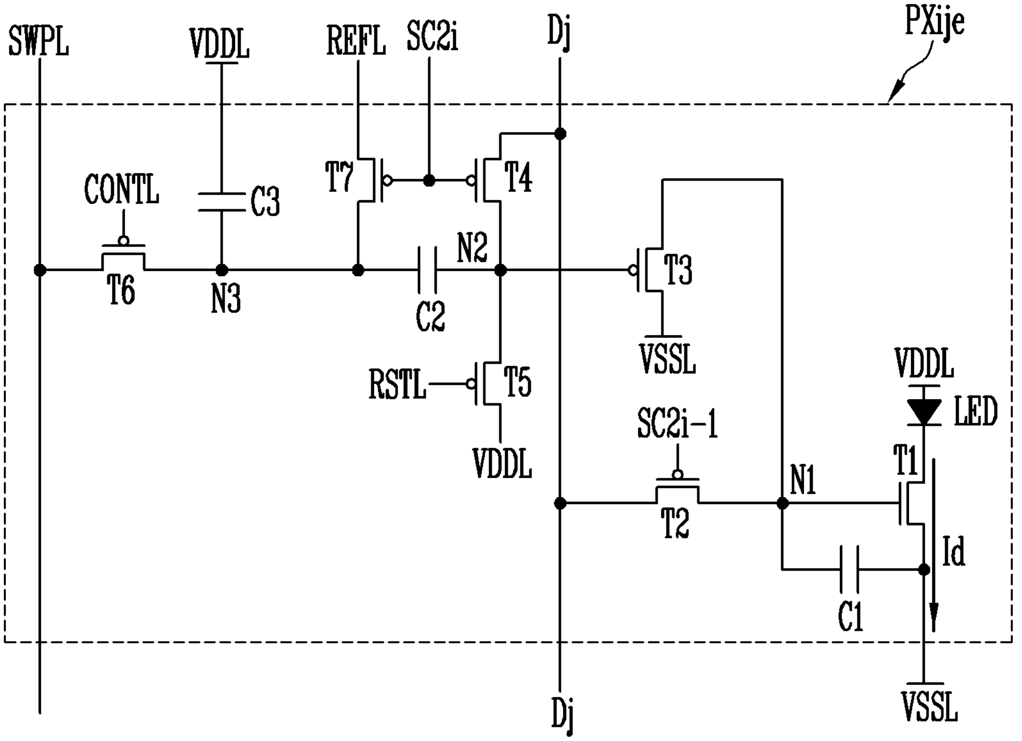
FIG. 12 is a diagram illustrating an example of a pixel of FIG. 1 in accordance with an embodiment of the present disclosure.

FIG. 12 is a diagram illustrating an example of a pixel of FIG. 1 in accordance with an embodiment of the present disclosure. The pixel PXije of FIG. 12 illustrates an example in which the location of the light emitting element LED is different from that of the pixel PXijd of FIG. 10.

Referring to FIG. 12, the light emitting element LED may be disposed between the drain electrode of the first transistor T1 and the first power line VDDL. A method of driving the pixel PXije of FIG. 12 is the same or substantially the same as that of the pixel PXijd of FIG. 10, and thus, redundant description thereof may not be repeated.

The operation of the processor of the display device 10 or the method of driving the display device 10 in accordance with various embodiments of the present disclosure may be implemented as software and loaded on the display device 10.

In the pixels PXij, PXija, PXijb, PXijc, PXijd, and PXije in accordance with various embodiments of the present disclosure, when a difference in luminance between pixels is caused by a difference in characteristics of the first transistor T1 (e.g., the threshold voltage, electron mobility, and/or the like), a compensated emission voltage may be applied to each pixel PXij, PXija, PXijb, PXijc, PXijd, PXije. A compensation method may employ any suitable compensation techniques as would be known to those skilled in the art, for example, such as an optical compensation scheme, an internal compensation scheme, an external compensation scheme, and/or the like.

As described herein, aspects and features of various embodiments of the present disclosure may be directed to a pixel circuit capable of mitigating or reducing a color shift phenomenon.

While aspects and features of the present disclosure are described with reference to the exemplary embodiments, it should be understood that the above-described embodiments are merely descriptive and should not be considered limiting. Accordingly, it will be understood by those skilled in the art that various modifications, changes, substitutions, and/or alternations may be made herein, without departing from the spirit and scope of the present disclosure as defined by the following claims, and their equivalents.

Accordingly, the spirit and scope of the present disclosure is not limited to the detailed descriptions of the various embodiments of the present disclosure, and should be defined by the accompanying claims and their equivalents. Furthermore, all changes or modifications to one or more embodiments of the present disclosure that may be derived from the meaning and scope of the claims, and equivalents thereof, should be construed as being included in the scope of the present disclosure.

What is claimed is:

1. A pixel circuit comprising:

a first transistor comprising a gate electrode coupled to a first node, a drain electrode coupled to a first power line, and a source electrode coupled to a second power line;

a light emitting element coupled between the second power line and the first transistor;

a second transistor coupled between a data line and the first node, the second transistor comprising a gate electrode coupled to a first scan line;

a first capacitor coupled between the first node and the source electrode of the first transistor;

a third transistor coupled between the first node and the second power line, the third transistor comprising a gate electrode coupled to a second node;

a fourth transistor coupled between the second node and the data line, the fourth transistor comprising a gate electrode coupled to a second scan line; and a second capacitor coupled between the second node and a first control line, and comprising a first electrode to receive a voltage of the first control line and a second electrode to receive a data voltage of the data line.

2. The pixel circuit according to claim 1, wherein the first control line is configured to supply the voltage that is gradually reduced or gradually increased during a first period.

3. The pixel circuit according to claim 2, wherein a voltage of the second power line is less than a voltage of the first power line during the first period.

4. The pixel circuit according to claim 2, wherein a turn-on period of the fourth transistor does not overlap with a turn-on period of the second transistor.

5. The pixel circuit according to claim 2, wherein, after a second period having a duration that is less than that of the first period has passed, the third transistor is turned on, and the first transistor is turned off.

6. The pixel circuit according to claim 2, further comprising a fifth transistor coupled between the second node and the first power line, the fifth transistor comprising a gate electrode coupled to a second control line.

7. The pixel circuit according to claim 6, wherein a turn-on period of the fifth transistor does not overlap with a turn-on period of the second transistor.

8. The pixel circuit according to claim 6, further comprising a sixth transistor coupled between the second capacitor and the first control line, the sixth transistor comprising a gate electrode coupled to a third control line.

9. The pixel circuit according to claim 8, wherein the sixth transistor is configured to be turned on during the first period.

10. A pixel circuit comprising:

a first transistor comprising a gate electrode coupled to a first node, a drain electrode coupled to a first power line, and a source electrode coupled to a second power line;

a light emitting element coupled between the second power line and the first transistor;

a second transistor coupled between a data line and the first node, the second transistor comprising a gate electrode coupled to a first scan line;

a first capacitor coupled between the first node and the source electrode of the first transistor;

a third transistor coupled between the first node and the second power line, the third transistor comprising a gate electrode coupled to a second node;

a fourth transistor coupled between the second node and the data line, the fourth transistor comprising a gate electrode coupled to a second scan line;

a second capacitor coupled between the second node and a first control line;

a fifth transistor coupled between the second node and the first power line, the fifth transistor comprising a gate electrode coupled to a second control line;

a sixth transistor coupled between the second capacitor and the first control line, the sixth transistor comprising a gate electrode coupled to a third control line;

a third power line; and a seventh transistor coupled between a third node and the third power line, the seventh transistor comprising a gate electrode coupled to the second scan line, wherein the first transistor is an N-type transistor, wherein the second transistor is a P-type transistor, and wherein the first control line is configured to supply a voltage that is gradually reduced or gradually increased during a first period.

11. A pixel circuit comprising:

a first transistor comprising a gate electrode coupled to a first node, a drain electrode coupled to a first power line, and a source electrode coupled to a second power line;

a light emitting element coupled between the first power line and the first transistor;

a second transistor coupled between a data line and the first node, the second transistor comprising a gate electrode coupled to a first scan line;

a first capacitor coupled between the first node and the source electrode of the first transistor;

a third transistor coupled between the first node and the second power line, the third transistor comprising a gate electrode coupled to a second node;

a fourth transistor coupled between the second node and the data line, the fourth transistor comprising a gate electrode coupled to a second scan line; and a second capacitor coupled between the second node and a first control line, and comprising a first electrode to receive a voltage of the first control line and a second electrode to receive a data voltage of the data line.

12. The pixel circuit according to claim 11, wherein the first control line is configured to supply the voltage that is gradually reduced or gradually increased during a first period.

13. The pixel circuit according to claim 12, wherein a voltage of the second power line is less than a voltage of the first power line during the first period.

14. The pixel circuit according to claim 12, wherein a turn-on period of the fourth transistor does not overlap with a turn-on period of the second transistor.

15. The pixel circuit according to claim 12, wherein, after a second period having a duration that is less than that of the first period has passed, the third transistor is turned on, and the first transistor is turned off.

16. The pixel circuit according to claim 12, further comprising a fifth transistor coupled between the second node and the first power line, the fifth transistor comprising a gate electrode coupled to a second control line.

17. The pixel circuit according to claim 16, wherein a turn-on period of the fifth transistor does not overlap with a turn-on period of the second transistor.

18. The pixel circuit according to claim 16, further comprising a sixth transistor coupled between the second capacitor and the first control line, the sixth transistor comprising a gate electrode coupled to a third control line.

19. The pixel circuit according to claim 18, wherein the sixth transistor is configured to be turned on during the first period.

20. The pixel circuit according to claim 18, further comprising:

a third power line; and a seventh transistor coupled between a third node and the third power line, the seventh transistor comprising a gate electrode coupled to the second scan line.

* * * * *